3,461,086
POLYETHER URETHANE FOAMS FROM CERTAIN HETERIC POLYETHERS
Riley F. Mogford and Carl C. Thurman, Jr., Lake Jackson, Tex., assignors to The Dow Chemical Company, Midland, Mich., a corporation of Delaware
No Drawing. Filed Mar. 5, 1964, Ser. No. 349,750
Int. Cl. C08g 22/14, 22/44
U.S. Cl. 260—2.5                    1 Claim

ABSTRACT OF THE DISCLOSURE

Flexible polyurethane foams having improved tensile strength and elongation are prepared using heteric polyethers which are the condensation product of a glycerine-propylene oxide adduct and a mixture of propylene oxide and ethylene oxide which are in the ratios of between 92/8 and 70/30.

---

This invention concerns polyether urethane foams and a method of making the same. It relates more particularly to flexible polyurethane foams prepared from certain polyether polyols and a polyisocyanate and pertains to a method of making the flexible foamed products.

It is known to prepare polyurethane foams by reaction of a polyether polyol and a polyisocyanate. An excess of diisocyanate over that needed to react with the polyol to form the polyurethane is generally used to provide isocyanate groups for reaction with water to form carbon dioxide in the mixture to foam or develop the desired porosity in the material. Alternatively, volatile organic fluids such as aliphatic hydrocarbons or halogenated aliphatic hydrocarbons are mixed with the starting materials and blended into the reacting mass so that they are vaporized by the exothermic urethane reaction to form gases or vapors which expand the reacting mass to a foam or spongy product.

While the methods heretofore used for making polyether urethane foams are satisfactory, the foams often are deficient in their physical properties, particularly in tensile strength and elongation, which renders the foams less useful for many purposes for which they are otherwise well suited.

It has now been discovered that polyether urethane foams possessing good tensile strength and high elongation values, together with good resiliency, compression set and load bearing properties, can readily be obtained by reaction of a polyisocyanate with a polyether polyol and water as more fully hereinafter described.

The polyisocyanates to be employed are those having two, three or more NCO groups. Examples of suitable polyisocyanates are hexamethylene isocyanate, tolylene 2,4- or tolylene 2,6-diisocyanate, diphenyl methane diisocyanate, p,p-metaphenylene diisocyanate, p-phenylene diisocyanate, naphthalene diisocyanate, dimethyl diphenylmethane diisocyanate, dianisidine diisocyanate and "Papi," polymethylene polyphenylisocyanate, having the general formula

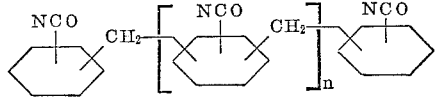

wherein n has an average value of about 1, or mixtures of any two or more of such polyisocyanates. The isocyanate is employed in amount corresponding to at least about a chemically equivalent proportion to react with the OH groups in both the polyether polyol and the water initially used, preferably in amount corresponding to from about 1 to 1.05 NCO group per chemically equivalent OH group in both the water and the polyether polyol employed. In this reaction the chemical equivalent weight of water is 9.

The polyether polyol starting material can consist of (A) from 60 to 100 percent by weight of one or more of the reaction products of (a) an aliphatic polyhydroxy compound such as ethylene glycol, 1,2-propylene glycol, 1,3-propanediol, 1,2-butylene glycol, 1,3-butanediol, 1,4-butanediol, 2,3-butanediol, 2-methyl-1,2-propanediol, 2, 2-dimethyl-1,3-propanediol, 2-methyl-2,4-pentanediol, 2-ethyl-1,3-hexanediol, 1,5-pentanediol, 2,5-dimethyl-2,5-hexanediol, 1,6-hexanediol, 1,18-octadecanediol, glycerol, pentaglycerol, pentaerythritol, and trimethylolpropane, or an aromatic polyhydroxy compound such as 1,2-dihydroxybenzene, 1,3-dihydroxybenzene, 1,4-dihydroxybenzene, 1,2,3-trihydroxybenzene, 1,2,4-trihydroxybenzene, 1,3,5-trihydroxybenzene, 1,2,4,5-tetrahydroxybenzene, 1, 2,3,5 - tetrahydroxybenzene, 1,1-bis-(4-hydroxyphenyl)methane and 4,4'-isopropylidenediphenol, or a mixture of any two or more of such aliphatic and aromatic polyols, containing from 2 to 18 carbon atoms and from to 2 to 4 OH groups in the molecule, and (b) a mixture of ethylene oxide and 1,2-propylene oxide, or ethylene oxide and propylene oxide separately in any order of addition, with the proviso that 1,2-propylene oxide, or a mixture of 1,2-propylene oxide containing from 8 to 30 percent by weight of ethylene oxide is always the last moiety to be reacted in preparing the polyether polyol starting material, said polyether polyol starting material containing from about 8 to about 30 percent by weight of ethylene oxide in chemically combined form and having an OH equivalent weight of from 1000 to 2000, and correspondingly (B) from 40 to 0 percent by weight of a different polyether polyol that is the reaction product or adduct of (c) a polyhydroxy compound such as sorbitol, mannitol, galactose, tripentaerythritol, or sucrose containing from 6 to 15 carbon atoms and from 5 to 8 OH groups in the molecule, and ethylene oxide and 1,2-propylene oxide as set forth in (b) above, said adduct containing from 8 to 30 percent by weight of ethylene oxide in chemically combined form and having an OH equivalent weight of from 1000 to 2000.

Thus, the polyether polyol starting material can consist entirely of one or more of the polyether polyols of (A) or a mixture of at least 60 percent by weight of one or more of the polyether polyols of (A) and up to 40 percent by weight of one or more of the polyether polyols of (B).

The polyether polyol starting materials are preferably a mixture of two or more of the polyether polyols of (A) consisting of from 75 to 85 percent by weight of the reaction product of an aliphatic polyol such as glycerine, trimethylolpropane, pentaerythritol, and pentaglycerol, having from 3 to 5 carbon atoms and from 3 to 4 OH groups in the molecule and a mixture of ethylene oxide and 1,2-propylene oxide consitsing of from 15 to 20 percent by weight ethylene oxide, said polyether polyol having an OH equivalent weight of from 1000 to 2000, and correspondingly from 25 to 15 percent by weight of a polyether polyol that is the reaction product of a diol containing from 2 to 18 carbon atoms in the molecule and a mixture of ethylene oxide and 1,2-propylene oxide consisting of from 15 to 20 percent by weight ethylene oxide, said polyether diol having an OH equivalent weight of from 1000 to 1500.

It is important that the polyether polyol starting materials be the reaction product of both ethylene oxide and 1,2-propylene oxide, preferably the reaction product of a mixture of said alkylene oxides in proportions to form a polyether polyol having an OH equivalent weight between 1000 and 2000 and containing between 8 and 30, preferably from 15 to 20, percent by weight of ethylene oxide, in order to obtain poylether urethane foams possessing the improved tensile strength and elongation properties, together with good compression set, resiliency and load bearing characteristics, according to the invention. Polyether polyols prepared without the ethylene oxide, or end-capped with ethylene oxide alone, are generally unsuitable to produce urethane foams having the improved tensile strength and elongation values of foams made from the polyether polyols containing both ethylene oxide and propylene oxide in accordance with the invention.

In making the polyether urethane foam it is important that a small amount of water be included in the reaction mixture not only to provide carbon dioxide by reaction with the polyisocyanate to foam or aid in developing the desired porosity in the material, but the water has an action of producing flexible foams possessing a plurality of desired properties.

The water is employed in an amount corresponding to from about 2.5 to about 5 percent by weight of the polyether polyol initially used. Water reacting with the isocyanate to form carbon dioxide can be used as the sole blowing agent to produce good foam, but advantageously the water is used in the mixture, together with an inert stable vaporizable liquid or volatile organic fluid such as lower molecular weight alkanes, alkenes and halogen-substituted lower molecular weight alkanes boiling below 110° C. at atmospheric pressure. Suitable volatile organic compounds are pentane, hexane, hexene, pentene, octane heptane, butane, ethyl chloride, methylene chloride, dichlorodifluoromethane, trichlorofluoromethane, dichlorofluoromethane, trichlorotrifluoroethane, and dichlorotetrafluoroethane.

The polyether urethane foam can be prepared in known ways employing usual polyurethane recipes and in a batch, pre-polymer or one-shot process. One method consists in pumping the ingredients separately or as a mixture of two or more ingredients through a metering device into a mixing chamber wherein the ingredients are rapidly and uniformly blended with one another in the desired proportions and the blended mixture is discharged into an open mold, which can be a trough, or into a closed mold and is allowed to raise, expand or foam, and cure at ambient temperature and pressure conditions.

A suitable recipe for making the polyether urethane foam is as follows:

| Ingredient— | Parts by weight |
|---|---|
| Polyether polyl (OH eq. wt. 1000) | 100 |
| Tolylene diisocyanate (105 index) | 34.5–60.0 |
| Trichlorofluoromethane | 0–15 |
| Water | 2.5–5 |
| Silicone oil [1] | 1–2 |
| Triethylenediamine [2] | 0.1–0.25 |
| Stannous octoate [3] | 0.15–0.35 |

[1] A silicone oil used as a foam stabilizer and cell regulator. It is disclosed in U.S. Patent No. 2,834,748. A preferred species is an alkyl silane polyoxyalkylene block copolymer of the formula

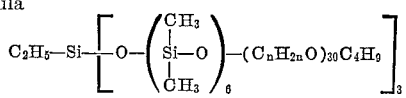

wherein $C_nH_{2n}O$ is a mixed polyoxyethylene oxypropylene block copolymer containing about 17 oxyethylene units and about 13 oxypropylene units.

[2] Amine catalysts such as triethylenediamine, N-ethylmorpholine, N,N,N',N'-tetramethyl butane diamine are employed to catalyze the isocyanate-water reaction.

[3] Organo metallic catalysts such as stannous octoate, stannous oleate, and the like are employed to catalyze the polyol-isocyanate reaction and balance it against the isocyanate-water reaction.

In preparing the polyether urethane foam, the ingredients except the isocyanate are mixed together with vigorous stirring, e.g. in a Waring Blendor. Thereafter, the tolylene diisocyanate is added and is rapidly blended with the other ingredients by stirring for a few seconds. The resulting mixture is poured into a mold such as an open trough box or cup and is allowed to foam at ambient conditions. The foam may, if desired, be cured by heating it in an air oven at 90–110° C. for periods of time of from 10 to 60 minutes or more.

The following examples illustrate ways in which the principle of the invention has been applied, but are not to be construed as limiting its scope.

EXAMPLE 1

(A) A charge of 160 parts by weight of an adduct of glycerine and 1,2-propylene oxide, having an OH equivalent weight of 150, and containing 3 percent by weight of potassium hydroxide as catalyst, was placed in a pressure resistant vessel equipped with a stirrer and means for heating and cooling the same. The vessel was swept with nitrogen gas to remove air and/or oxygen. The adduct was stirred and heated in the closed vessel to a temperature of 110° C. Thereafter, a liquid mixture of a blend of 260 parts by weight of ethylene oxide and 1350 parts by weight of 1,2-propylene oxide was fed to the vessel through a valved inlet, while heating and stirring the resulting mixture at temperatures between 100° and 120° C., under a pressure of the reactants at the temperatures employed of from 10 to 30 pounds per square inch gauge pressure, over a reaction period of 48 hours. After reaction of the mixture of added alkylene oxides, the resulting mixture was cooled and was neutralized. The neutralized mass was heated to a temperature of 120° C. under an absolute pressure of 10 millimeters of mercury to remove volatile ingredients. The residue was filtered to remove insoluble material. The filtrate was a liquid polyether triol having an OH equivalent weight of about 1320, and contained about 15 percent by weight of ethylene oxide in chemically combined form.

(B) A flexible polyurethane foam was prepared from the polyether triol prepared in part A above and other ingredients employing the recipe:

| Ingredient— | Parts by weight |
|---|---|
| Polyether triol (OH eq. wt.=1320) | 300 |
| Tolylene diisocyanate (105 index) | 167 |
| Water | 14.4 |
| Trichlorofluoromethane | 9 |
| Silicone oil | 6 |
| Triethylenediamine | 0.3 |
| Stannous octoate | 0.75 |

The procedure for making the polyurethane foam was to blend together all of the ingredients, except the tolylene diisocyanate, then add the tolylene diisocyanate to the mixture, while stirring with vigorous agitation such as in a Waring Blendor, after which the resulting mixture was poured into a 12 x 12 inch square corrugated cardboard carton 8 inches deep. It was allowed to foam, raise and set. It was then placed in an air oven and heated at 90–110° C. for a period of 30 minutes, then was removed and was allowed to cool to room temperature. The foam bun was placed in a constant temperature room at 73–74° F. and fifty percent relative humidity for a period of 16 hours. Thereafter, the properties of the polyurethane foam were determined, on test pieces of the foam cut from the bun, using procedures similar to those described in ASTM D1564–59T. The foam was a tough, resilient, flexible body and was composed of uniform fine pores or cells. The properties determined for the foam are reported under A below.

For purpose of comparison, a foam was prepared in similar manner and by a similar recipe, except using a polyether triol prepared by procedure similar to that employed in part A above except using 1,2-propylene oxide alone as the added alkylene oxide to form a triol having an OH equivalent weight of about 1330. The properties determined for the polyurethane foam prepared from this polyether triol are reported under B below.

|  | A | B |
|---|---|---|
| Ethylene oxide in triol, percent | 15 | None |
| Compression set, percent | 10.4 | 12.9 |
| Density, lbs./cu. ft | 1.34 | 1.43 |
| Resiliency, percent | 38 | 37 |
| Tensile Strength, lbs./sq. in | 10.8 | 8.3 |
| Elongation, percent | 270 | 130 |
| 2″ ILD (25%) | 26 | 25 |

EXAMPLE 2

(A) A charge of 82 parts by weight of an adduct of glycerine and 1,2-propylene oxide, having an OH equivalent weight of 150, and containing about 3 percent by weight of potassium hydroxide as catalyst, was placed in a pressure resistant vessel equipped with a stirrer and means for heating and cooling the same. The vessel was swept with nitrogen gas to remove air and/or oxygen. The adduct was stirred and heated in the closed vessel to a temperature of 110° C. Thereafter, a feed mixture, consisting of a blend of 91.4 parts by weight of ethylene oxide and 478.6 parts by weight of 1,2-propylene oxide, was added gradually over a period of 24 hours while heating and stirring the resulting mixture at temperatures between 100 and 120° C. in the vessel under a pressure of the reactants at the temperature employed of from 15–30 pounds per square inch gauge pressure. After reaction of the added mixture of the ethylene oxide and the propylene oxide, the reacted mass was neutralized. The neutralized mass was heated to a temperature of 120° C. under an absolute pressure of 10 millimeters of Hg to remove volatile ingredients. The residue was filtered to remove insoluble salt and recover the product. The product was recovered as a pale, straw-colored viscous liquid. It had an OH equivalent weight of 1000, a viscosity of 222 centistokes at 100° F. It contained about 14 percent by weight of ethylene oxide in chemically combined form.

(B) In each of a series of experiments, a flexible polyurethane foam was prepared from a mixture of ingredients as follows:

| Ingredient— | Parts by weight |
|---|---|
| Polyol (prepared in part A above) (OH eq. wt.=1000) | 300 |
| Tolylene diisocyanate (105 index) | 174 |
| Water | 14.4 |
| Trichloromonofluoromethane | 9 |
| Silicone oil | 6 |
| Triethylenediamine | 0.3 |
| Stannous octoate | Variable |

The procedure for making the foam was to blend together all of the ingredients except the tolylene diisocyanate, then add the tolylene diisocyanate to the mixture and blend it into the mass with vigorous stirring such as in a Waring Blendor, after which the resulting mixture was poured into a 12 x 12 inch square cardboard carton 8 inches deep. The foam was allowed to raise and set. It was then placed in an air oven and heated at 90–110° C. for a period of 30 minutes after which it was removed and was allowed to cool to room temperature. The foam bun was placed in a constant temperature room maintained at 73–74° F. And 50 percent relative humidity for a period of 16 hours. Thereafter, the properties of the polyurethane foam were determined employing procedures similar to those described in ASTM D1564–59T. Table I identifies the experiments and gives the amount of stannous octoate used as catalyst. The table also gives the properties determined for the foamed polyurethane product, and shows the results obtained when using different amounts of stannous octoate catalyst.

TABLE I

| Run No | A | B | C |
|---|---|---|---|
| Stannous octoate (parts) | 0.75 | 0.90 | 1.03 |
| Compression set, percent | 6.5 | 7.3 | 8.1 |
| Density, lbs./cu. ft | 1.36 | 1.26 | 1.34 |
| Resiliency, percent | 39 | 35 | 39 |
| Tensile strength, lbs./sq. in | 14.1 | 13.5 | 12.0 |
| Elongation, percent | 275 | 275 | 262 |
| 2″, 25% ILD | 23 | 22 | 2 |

EXAMPLE 3

(A) A polyol was prepared by reacting 144 parts by weight of an adduct of glycerine and 1,2-propylene oxide, which adduct had an OH equivalent weight of 150 with a mixture of 216 parts by weight of ethylene oxide and 1134 parts by weight of 1,2-propylene oxide, employing procedures and potassium hydroxide catalyst similar to those employed in part A of Example 1. The product was a liquid polyether triol having an OH equivalent weight of 1326 and a viscosity of 325 centistokes at 100° F. The product contained 14.5 percent by weight of ethylene oxide.

(B) In each of a series of experiments, a flexible polyurethane foam was prepared employing a procedure and recipe as employed in Example 1, except using the polyether triol prepared in part A of this example. Table II gives the properties of the foam, and shows the results obtained with various amounts of stannous octoate catalyst.

TABLE II

| Run No | A | B | C |
|---|---|---|---|
| Stannous octoate, parts by weight | 0.60 | 0.75 | 1.05 |
| Compression set, percent | 8.8 | 10.4 | 10.0 |
| Density, lbs./cu. ft | 1.35 | 1.34 | 1.33 |
| Resiliency, percent | 44 | 38 | 37 |
| Tensile strength, lbs./sq. in | 11.1 | 10.8 | 11.0 |
| Elongation, percent | 255 | 270 | 255 |
| 2″, 25% ILD | 24 | 26 | 22 |

EXAMPLE 4

In each of a series of experiments, a polyurethane foam was prepared from a polyether triol that was prepared from an adduct of glycerine and 1,2-propylene oxide having an OH equivalent weight of 150 as starting material, and a mixture of ethylene oxide and 1,2-propylene oxide, to form a polyether triol product having an average OH equivalent weight of 1000 and containing about 15%, 21% and 27% ethylene oxide, respectively, in chemically combined form, as hereinafter stated. The polyether triols were prepared employing procedure similar to that employed in part A of Example 1. The polyurethane foam was prepared from the polyether triol of 1000 OH equivalent weight employing a recipe and procedure similar to that employed in part B of Example 2. Table III identifies the experiments and gives the proportion of chemically combined ethylene oxide in the polyol and the parts by weight of stannous octoate used as catalyst in making the foam. The table also gives the properties determined for the foams.

TABLE III

| Run No | A | B | C |
|---|---|---|---|
| Ethylene oxide in triol, percent | 15 | 21 | 27 |
| Stannous octoate, parts | 0.75 | 0.45 | 0.45 |
| Compression set, percent | 8.3 | 9.6 | 16.1 |
| Density, lbs./cu. ft | 1.36 | 1.41 | 1.54 |
| Resiliency, percent | 39 | 38 | 40 |
| Tensile strength, lbs./sq. in | 14.1 | 15.8 | 20.8 |
| Elongation, percent | 275 | 280 | 300 |
| 2″ ILD | 23 | 21 | 22 |

EXAMPLE 5

A polyoxyalkylene diol having an average molecular weight of 2000 was prepared by reacting a mixture of 330 parts by weight of ethylene oxide and 1640 parts of 1,2-propylene oxide with 134 parts by weight of dipropylene glycol starting material, employing procedure similar to that employed in part A of Example 1. The polyoxyalkylene diol contained about 15 percent by weight of chemically combined ethylene oxide. A polyurethane foam was prepared from the polyoxyalkylene diol employing a procedure similar to that employed in part B of Example 1, and the recipe given below.

| | Parts |
|---|---|
| Polyoxyalkylene diol (OH eq. wt.=1000) | 100 |
| Tolylene diisocyanate | 43.5 |
| Water | 3.4 |
| CCl$_3$F | 10.0 |
| Silicone oil | 1.5 |
| Triethylenediamine | .1 |
| Stannous octoate | .35 |

For purpose of comparison a polyurethane foam was prepared in similar manner from a polyoxypropylene diol having an average molecular weight of about 2000. The properties determined for the foams were as follows:

| | A | B |
|---|---|---|
| Ethylene oxide in polyglycol | 15 | None |
| Propylene oxide in polyglycol | 85 | 100 |
| Compression set, percent | 5.8 | 7.3 |
| Density, lbs./cu. ft | 1.35 | 1.35 |
| Resiliency, percent | 46 | 46 |
| Tensile strength, lbs./sq. ft | 14.1 | 9.5 |
| Elongation, percent | 375 | 190 |
| 4″ ILD | 24 | 22 |

EXAMPLE 6

A polyurethane foam was prepared from a polyoxyalkylene diol of 3000 average molecular weight consisting of 15 percent by weight ethylene oxide moieties and 85 percent 1,2-propylene oxide moieties, prepared in a manner similar to that employed in Example 5, both as to the procedures for making the polyoxyalkylene glycol or diol starting material and the polyurethane foam, except using 0.90 part of stannous octoate as catalyst in preparing the foam, and 40.5 parts toluene diisocyanate. The properties determined for the foam were as follows:

| | |
|---|---|
| Compression set _____percent__ | 6.9 |
| Density _____lbs./cu. ft__ | 1.38 |
| Resiliency _____percent__ | 47 |
| Tensile strength _____lbs./sq. in__ | 11.9 |
| Elongation _____percent__ | 585 |
| 4″ ILD | 20 |

Attempts to make a flexible foam from a polyoxypropylene glycol of 3000 molecular weight containing no ethylene oxide were unsuccessful. The cellular mass after sufficient time had lapsed for it to cure was too weak and crumbly to permit test specimens to be prepared.

EXAMPLE 7

(A) A polyether octol was prepared by reacting a mixture of 15 percent by weight of ethylene oxide and 85 percent of 1,2-propylene oxide with an adduct of sucrose and 1,2-propylene oxide having an OH equipment weight of about 125 as starting material, to form a polyether octol having an OH equivalent weight of 1000, employing procedure similar to that employed in part A of Example 1.

(B) A polyurethane foam was prepared from a mixture of 30 weight percent of the polyether octol prepared in part A of this example and 70 weight percent of a polyoxypropylene triol that was the adduct of glycerine and 1,2-propylene oxide and had an OH equivalent weight of 1000, employing the following recipe.

| | Parts |
|---|---|
| Polyether polyol | 100 |
| Tolylene diisocyanate | 44.5 |
| Water | 3.4 |
| CCl$_3$F | 10.0 |
| Silicone oil | 1.5 |
| Triethylenediamine | 0.1 |
| Stannous octoate | .20–.30 |

For purpose of comparison a polyurethane foam was prepared from a mixture of 30 weight percent of a polyether octol having an OH equivalent weight of 1000 and consisting of the adduct of sucrose and 1,2-propylene oxide, and 70 weight percent of a polyether triol having an OH equivalent weight of 1000 and consisting of the adduct of glycerine and 1,2-propylene oxide, in a similar manner.

The properties determined for the foams were as follows:

| | A | B |
|---|---|---|
| Ethylene oxide in octol, wt. percent | 15 | None |
| Stannous octoate (catalyst), parts | 0.25 | 0.30 |
| Compression set, percent | 4.5 | 6.7 |
| Density, lbs./cu. ft | 1.37 | 1.32 |
| Resiliency, percent | 50 | 43.4 |
| Tensile strength, lbs./sq. in | 11.2 | 10.5 |
| Elongation, percent | 150 | 120 |
| 4″ ILD (25%) | 30 | 33 |

EXAMPLE 8

(A) A polyether triol of 1550 OH equivalent weight was prepared by reacting 1600 parts of a mixture of 16 percent by weight of ethylene oxide and 84 percent by weight of 1,2-propylene oxide with 150 parts of an adduct of 150 OH equivalent weight of glycerine and 1,2-propylene oxide wihch contains about 3 percent potassium hydroxide, employing procedures similar to that employed in part A of Example 1. The product had an OH equivalent weight of 1550 and a viscosity of 390 centistokes at 100° F.

(B) A flexible urethane foam was made from the polyol made in part A of this example in a manner similar to that employed in Example 1, part B, except for 164 parts toluene diisocyanate. The foam properties are given in the following table. For comparison is given properties determined in a foam from a polyol of the OH equivalent weight of 1630 but containing no ethylene oxide.

| | A | B |
|---|---|---|
| Ethylene oxide in polyglycol | 15 | 0 |
| Propylene oxide in polyglycol | 85 | 100 |
| Compression set, percent | 11.0 | 13.0 |
| Density, lbs./cu. ft | 1.38 | 1.49 |
| Resiliency, percent | 38 | 36 |
| Tensile strength, p.s.i | 10.5 | 7.8 |
| Elongation, percent | 250 | 125 |
| 2″ ILD (25%) | 25 | 24 |

EXAMPLE 9

(A) A polyether triol was prepared by first reacting ethylene oxide with 100 parts by weight of an adduct of glycerine and 1,2-propylene oxide having an OH equivalent weight of 150 and containing 3 percent by weight of potassium hydroxide as catalyst, then reacting a further quantity of 1,2-propylene oxide with the material to form a polyether triol having an OH equivalent weight of 1000. A polyether urethane foam was prepared from the triol using the recipe:

| Ingredient— | Parts by weight |
|---|---|
| Triol | 100 |
| Tolylene diisocyanate | 44.5 |
| Water | 3.4 |
| Trichlorofluoromethane | 9.0 |
| Silicone oil | 1.5 |
| Triethylenediamine | 0.1 |
| Stannous octoate | 0.15–0.35 |

For purpose of comparison a polyurethane foam was prepared from a polyether triol that was the adduct of glycerine and 1,2-propylene oxide alone having an OH equivalent weight of 1000 and the above recipe. Table IV identifies the experiments and gives the properties determined for the foam.

TABLE IV

| Run No | A | B | C | D | E |
|---|---|---|---|---|---|
| Ethylene oxide in triol, percent | 0 | 0 | 9.3 | 9.3 | 9.3 |
| Stannous octoate, parts | 0.25 | 0.35 | 0.15 | 0.20 | 0.25 |
| Compression set, percent | 3.4 | 6.1 | 4.2 | 3.6 | 4.7 |
| Density, lbs./cu. ft | 1.32 | 1.33 | 1.36 | 1.34 | 1.30 |
| Resiliency, percent | 49 | 42 | 51 | 51 | 50 |
| Tensile strength, lbs./sq. ft | 10.6 | 10.6 | 11.2 | 11.2 | 11.6 |
| Elongation, percent | 150 | 150 | 165 | 175 | 165 |
| 4" ILD | 26 | 30 | 22 | 23 | 26 |

We claim:

1. A flexible polyether urethane foam prepared by reacting a mixture of an organic polyisocyanate and a polyether polyol having an OH equivalent weight between 1000 and 2000, consisting essentially of the condensation product of a mixture of from 92 to 70 weight percent propylene oxide and from 8 to 30 weight percent ethylene oxide with a polyhydroxy compound that is the reaction product of glycerine with from 1 to 6 moles of propylene oxide, said mixture of propylene oxide and ethylene oxide being in proportions such that said polyether polyol contains from 8 to 30 weight percent ethylene oxide and from 92 to 70 weight percent propylene oxide, based on the sum of the weights of the ethylene oxide and the propylene oxide in said polyether polyol.

References Cited

UNITED STATES PATENTS

| 3,380,967 | 4/1968 | Lowe et al. | 260—77.5 |
| 3,072,582 | 1/1963 | Frost | 260—2.5 |
| 3,087,900 | 4/1963 | Brown | 260—2.5 |
| 3,097,176 | 7/1963 | Bender et al. | 260—2.5 |
| 3,134,742 | 5/1964 | Wismer et al. | 260—2.5 |
| 3,153,002 | 10/1964 | Wismer et al. | 260—2.5 |

FOREIGN PATENTS

| 538,842 | 3/1957 | Canada. |
| 1,309,892 | 10/1962 | France. |
| 757,309 | 9/1956 | Great Britain. |
| 967,441 | 8/1964 | Great Britain. |

DONALD E. CZAJA, Primary Examiner

MICHAEL B. FEIN, Assistant Examiner

U.S. Cl. X.R.

260—77